Figure 1:
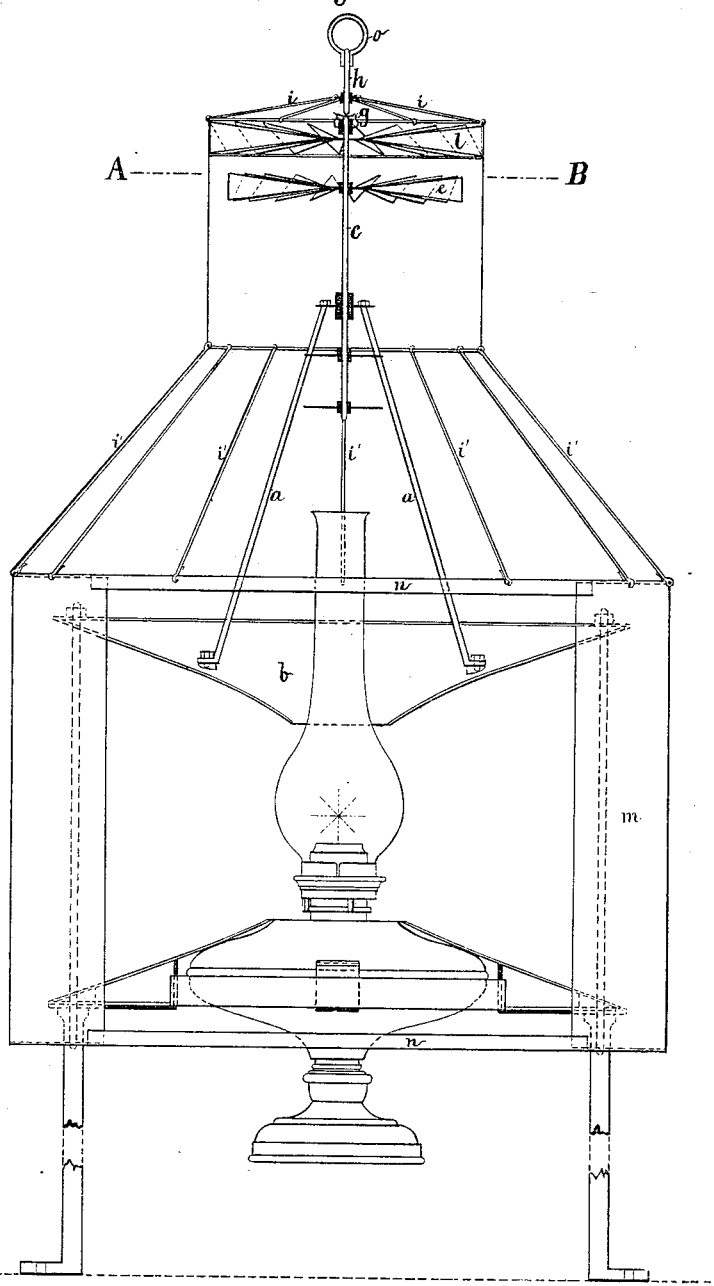

(No Model.) 13 Sheets—Sheet 1.

L. F. LINDBERG.
REVOLVING LIGHT APPARATUS.

No. 320,146. Patented June 16, 1885.

(No Model.)

L. F. LINDBERG.

REVOLVING LIGHT APPARATUS.

No. 320,146.

13 Sheets—Sheet 2.

Patented June 16, 1885.

Witnesses:
J. M. Blackwood
G. W. P. Swartz

Inventor:
Ludvig F. Lindberg,
by W. H. Doolittle,
Attorney

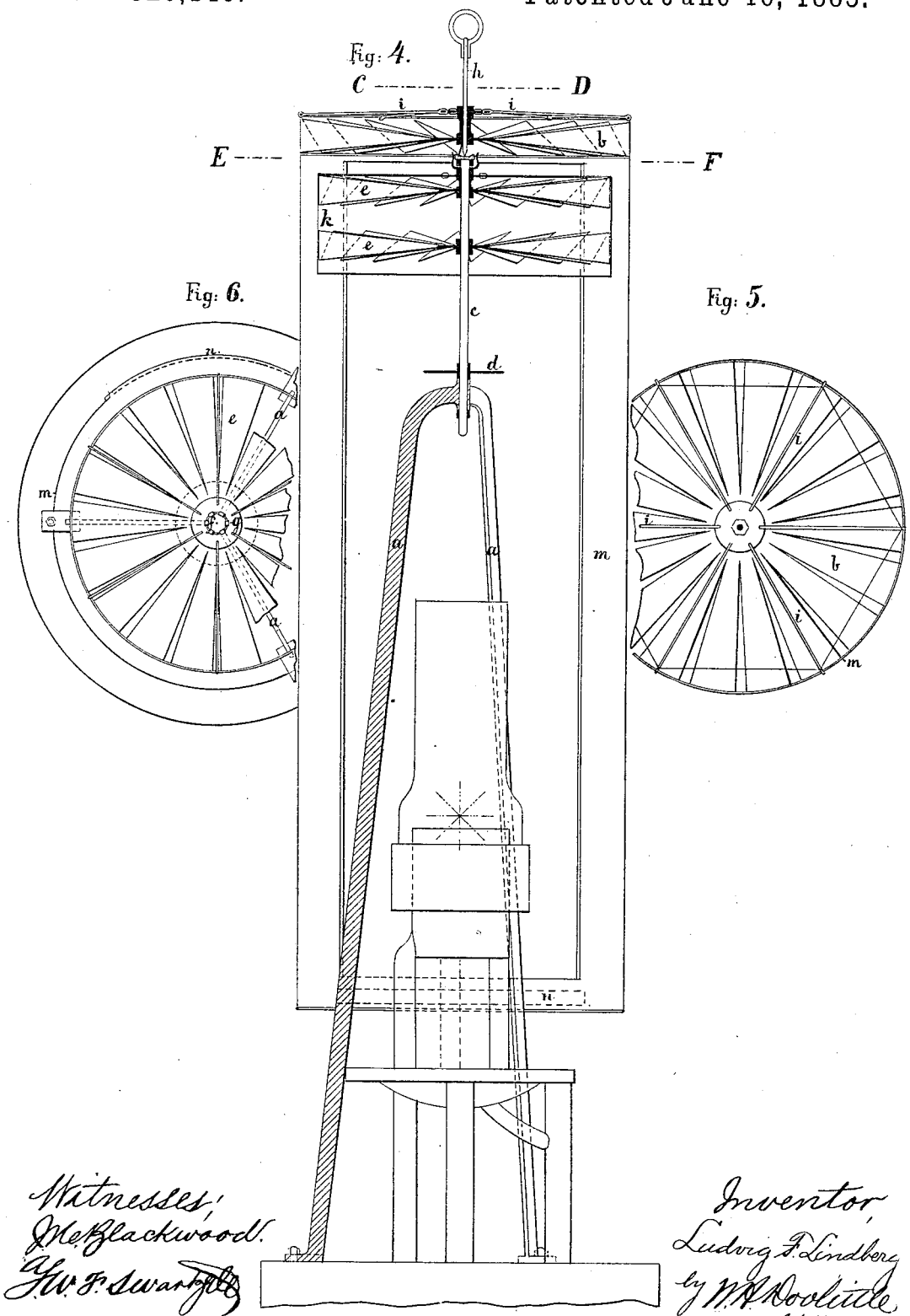

(No Model.)   L. F. LINDBERG.   13 Sheets—Sheet 4.

REVOLVING LIGHT APPARATUS.

No. 320,146.   Patented June 16, 1885.

Witnesses:
J. M. Blackwood
G. W. F. Swartzell

Inventor:
Ludvig F. Lindberg
by M. A. Doolittle
Attorney.

(No Model.) 13 Sheets—Sheet 5.
L. F. LINDBERG.
REVOLVING LIGHT APPARATUS.

No. 320,146. Patented June 16, 1885.

Fig: 8.

(No Model.)

13 Sheets—Sheet 6.

L. F. LINDBERG.
REVOLVING LIGHT APPARATUS.

No. 320,146. Patented June 16, 1885.

(No Model.) 13 Sheets—Sheet 7.

L. F. LINDBERG.
REVOLVING LIGHT APPARATUS.

No. 320,146. Patented June 16, 1885.

Witnesses:
J. M. Blackwood
G. W. F. Swartz

Inventor,
Ludvig F. Lindberg
by W. H. Doolittle
Attorney (No Model.) 13 Sheets—Sheet 8.

L. F. LINDBERG.
REVOLVING LIGHT APPARATUS.

No. 320,146. Patented June 16, 1885.

Witnesses:
J. H. Blackwood
R. S. Du Bois

Inventor:
Ludwig F. Lindberg
by Wm. H. Doolittle
Attorney (No Model.)

13 Sheets—Sheet 11.

L. F. LINDBERG.
REVOLVING LIGHT APPARATUS.

No. 320,146. Patented June 16, 1885.

(No Model.) 13 Sheets—Sheet 12.

L. F. LINDBERG.
REVOLVING LIGHT APPARATUS.

No. 320,146. Patented June 16, 1885.

Witnesses:
J. H. Blackwood
R. G. Du Bois

Inventor:
Ludwig F. Lindberg
by M. H. Doolittle
Attorney (No Model.)
13 Sheets—Sheet 13.
L. F. LINDBERG.
REVOLVING LIGHT APPARATUS.
No. 320,146. Patented June 16, 1885.
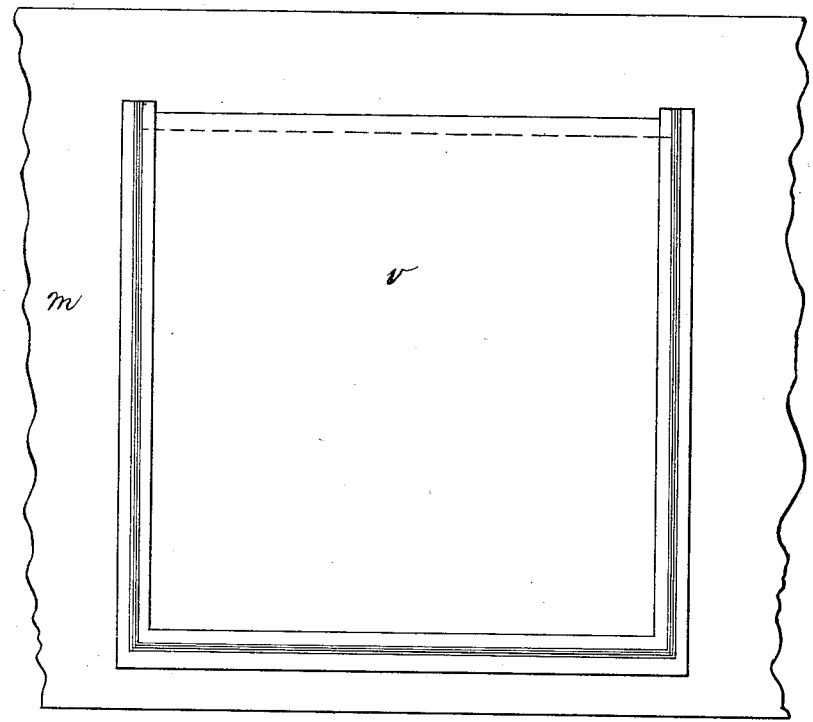
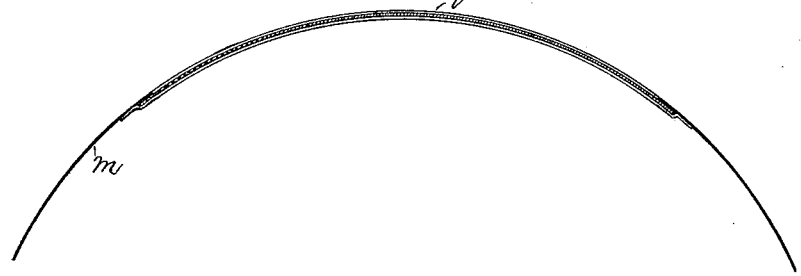

UNITED STATES PATENT OFFICE.

LUDVIG FREDRIK LINDBERG, OF STOCKHOLM, SWEDEN.

REVOLVING LIGHT APPARATUS.

SPECIFICATION forming part of Letters Patent No. 320,146, dated June 16, 1885.

Application filed December 19, 1883. (No model.) Patented in Sweden May 15, 1879, No. 122; in England October 6, 1882, No. 4,762; in Finland November 22, 1882; in Norway September 11, 1883; in Italy March 3, 1884, No. 435, and in France April 15, 1884, No. 160,016.

*To all whom it may concern:*

Be it known that I, LUDVIG FREDRIK LINDBERG, engineer, a subject of the King of Sweden, residing at Stockholm, in the Kingdom of Sweden, have invented new and useful Improvements in Revolving Light Apparatus for Producing Changes of Light, of which the following is a specification.

My invention relates to revolving light apparatus for obtaining occultations or flashes or other varieties of the light, either over the whole space illuminated or within the limits of a certain angle, and this without using clock-work or the like, which makes the revolving lights hitherto known very expensive and not so reliable, and, furthermore, the clock-works must often be wound up and attended. My apparatus is driven by the heat from the flame of the light, or from a special flame, in the following manner: The flame of the lamp heats the air and produces a rising air-current, which current, after having passed between the blades of one or more stationary directing propellers, strikes and sets in rotation a movable propeller, single or composite, to which is attached a frame provided with screens or glasses of different colors so arranged as to produce the desired occultations or flashes or other varieties of the light.

On the annexed drawings some applications of my invention to different kinds of lights are shown, but only as examples, as the shape and sizes of the apparatus and the arrangement of the revolving frame have to vary according to different purposes.

Figure 2:
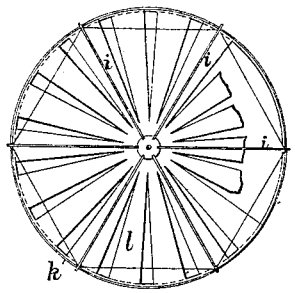
Figure 3:
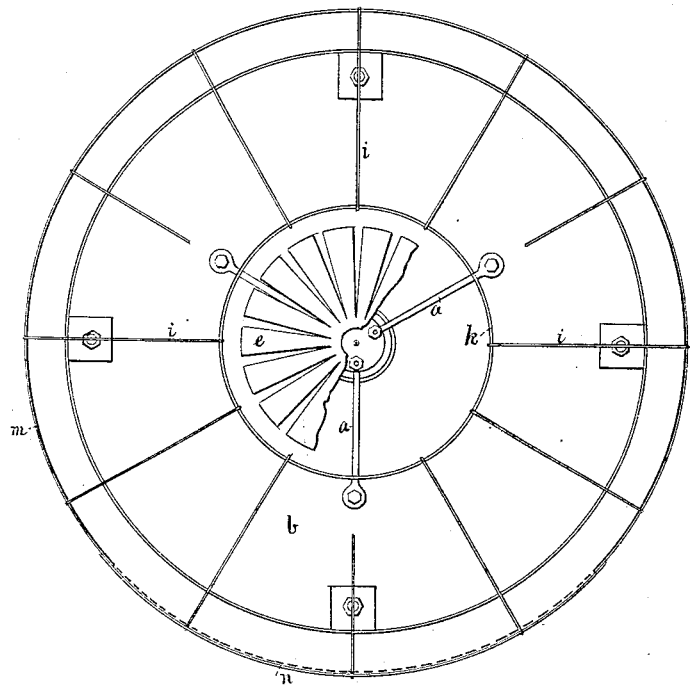
Figure 7:
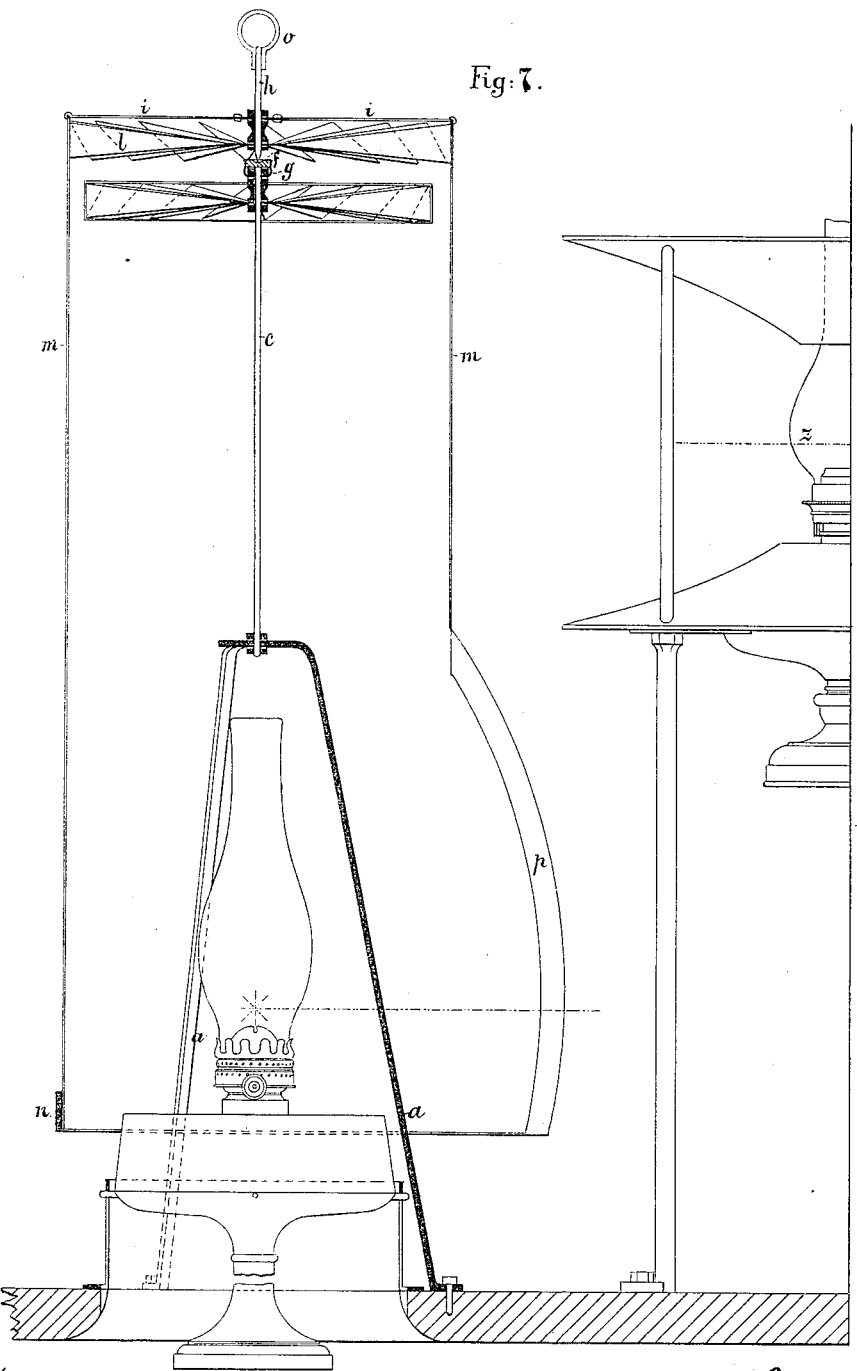
Figure 8:
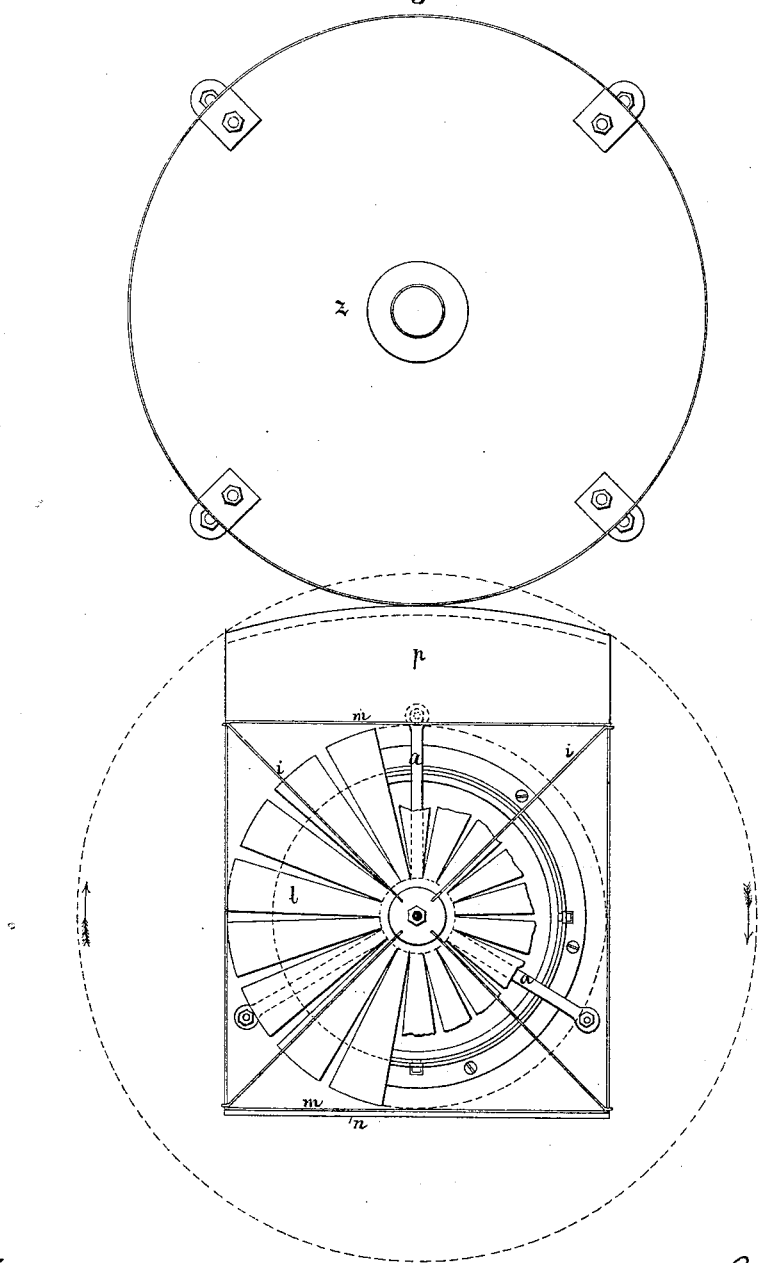
Figure 9:
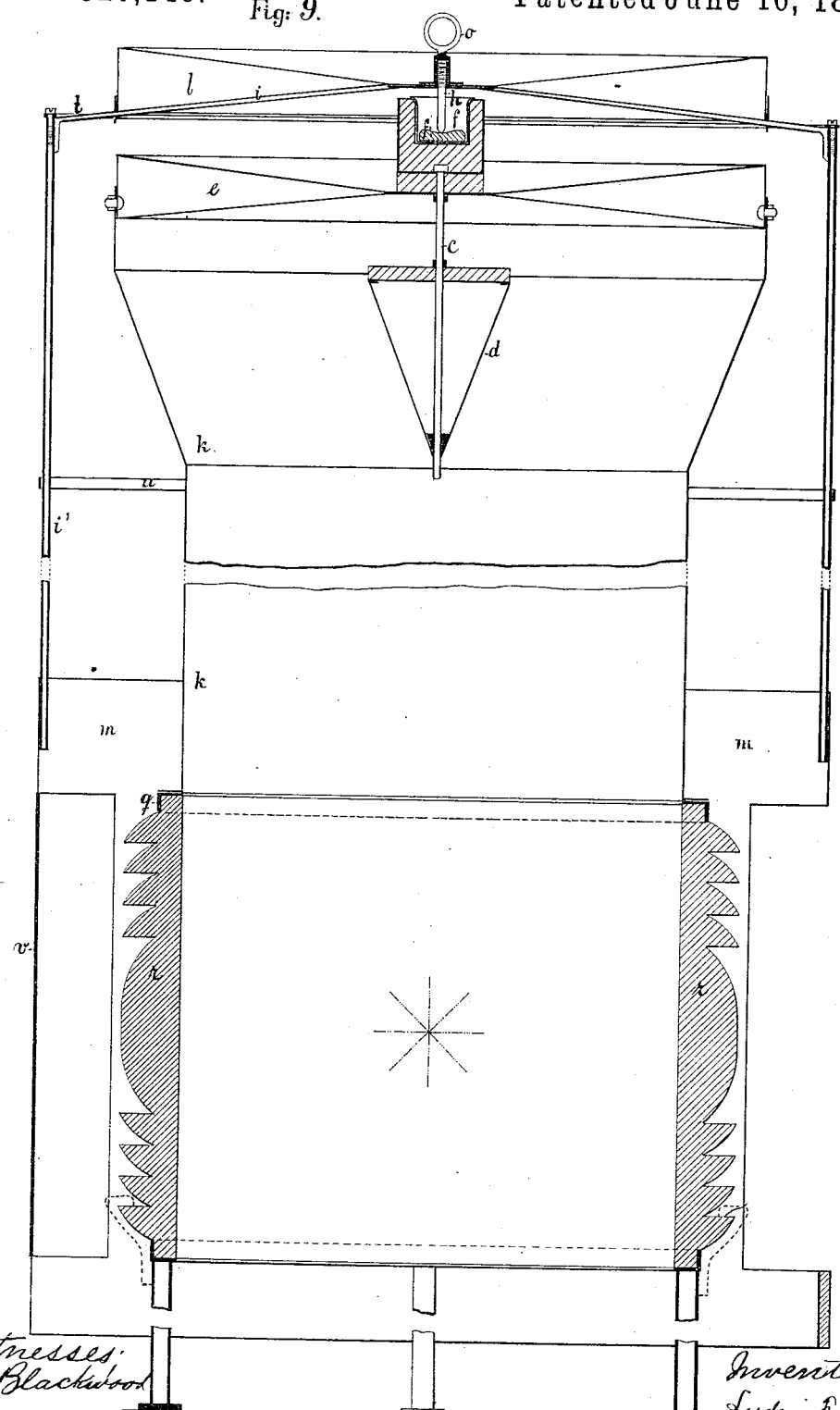
Figure 10:
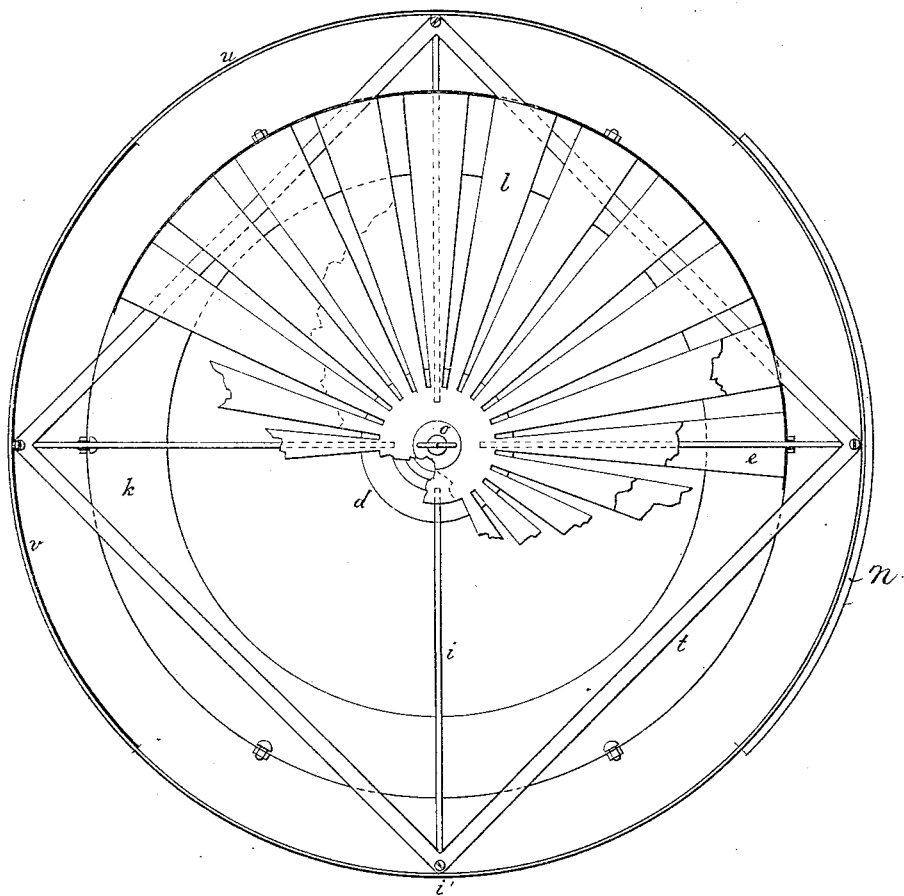
Figure 11:
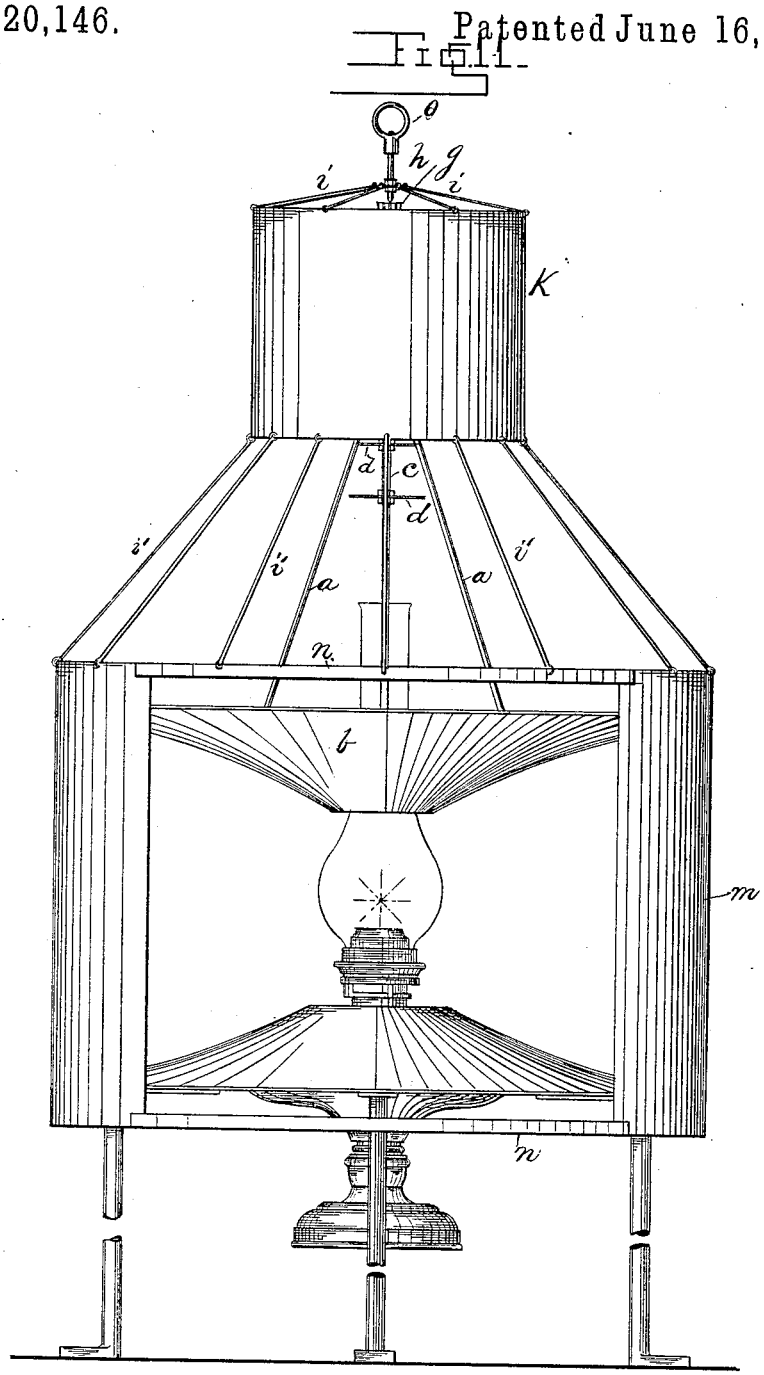
Figure 12:
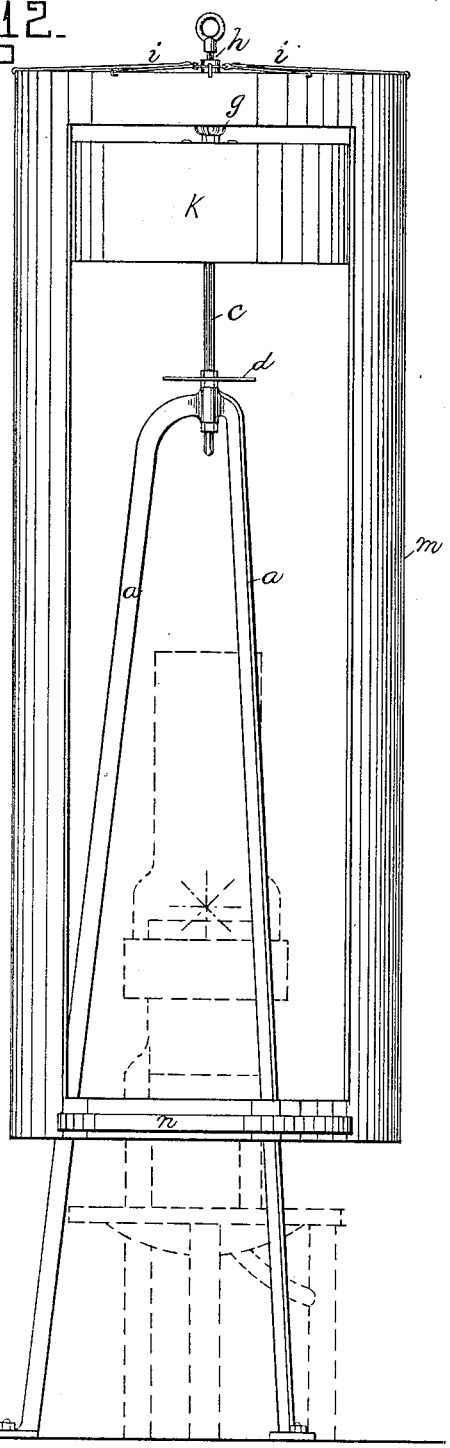
Figure 13:
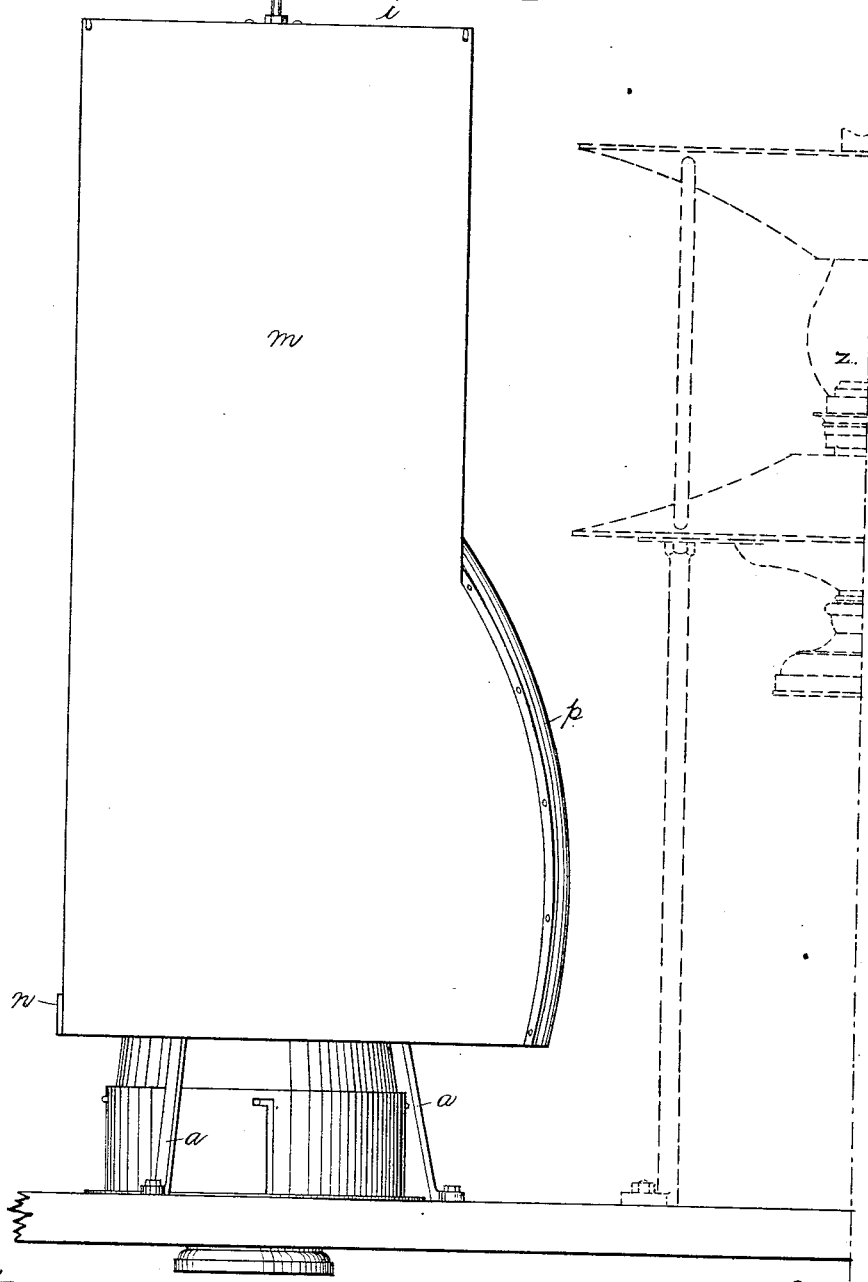
Figure 14:
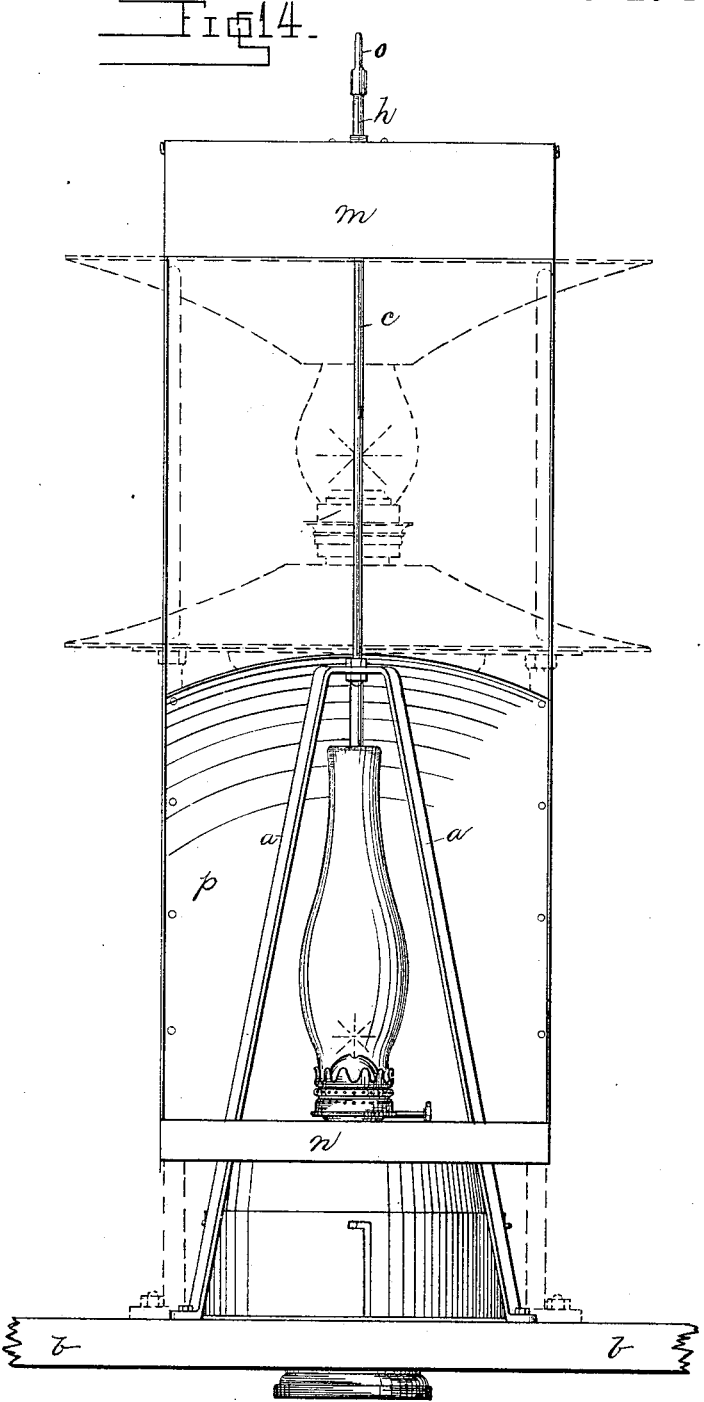
Figure 15:
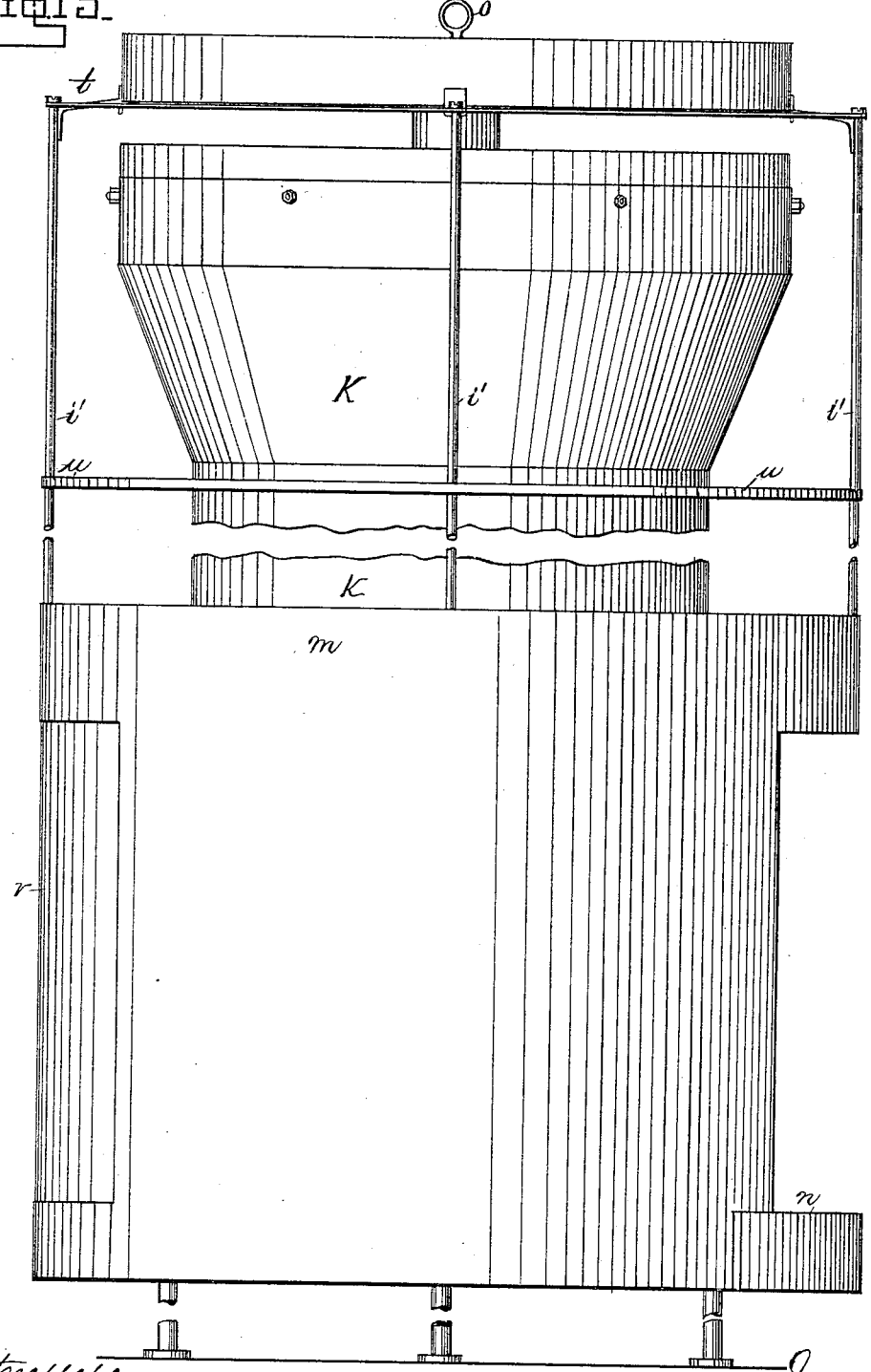

Figures 1, 2, and 3 show a revolving apparatus to be used for sideral lights, as also for lights having parabolic reflectors. Fig. 1 is a vertical section of the apparatus, partly in elevation. Fig. 2 is a plan of the upper part, and Fig. 3 a section taken on the line A B, Fig. 1, portions of the propellers being removed. Figs. 4, 5, and 6 represent an apparatus to be used for dioptric lights. Fig. 4 is a vertical section, and Figs. 5 and 6 horizontal sections along the lines C D and E F, Fig. 4. Figs. 7 and 8 show an apparatus intended to be employed at the side of fixed lights for producing occultations and flashes at certain angles. Fig. 7 is a vertical section, and Fig. 8 a plan partially in section. Figs. 9 and 10 show, in vertical section and plan, an apparatus intended, principally, for lights where the lamp is fed with mineral oil. Fig. 11 is an elevation of the apparatus shown in section in Figs. 1, 2, and 3. Fig. 12 is an elevation of the apparatus shown in section in Figs. 4, 5, and 6. Fig. 13 is an elevation of the apparatus shown in section in Figs. 7 and 8. Fig. 14 is a front elevation. Fig. 15 is an elevation of the apparatus shown in Figs. 9 and 10. Fig. 16 is part of the revolving casing $m$, showing a mode of fixing a colored glass or the like; and Fig. 17 shows the same in plan.

In Fig. 1 the revolving apparatus is supported by the tripod $a$, fixed to the upper reflector, $b$, of the lamp. The tripod carries a support, $c$, provided on its lower part with two deflectors, $d$, to moderate the heat. At its upper part it is provided with a fixed propeller, $e$, (not revolving,) and at the top there is a cup of agate, $f$, or other suitable material held in its place by means of the feathering-claws $g$. The revolving portion of the apparatus consists of a pivot, $h$, resting in the cup $f$ in such a way as to turn easily on its point. To this pivot are attached suspenders $i$, reaching to and supporting the heat-collecting box $k$. In the upper part of this box is fixed the movable propeller $l$, and to the lower part the suspending-rods $i'$, fixed to and carrying the occulting-screen $m$. To obtain the flashes, an opening is made in this screen. The inside of the screen opposite the opening ought to be silvered. On the upper and lower edges of this opening counterpoises $n$ are placed as equivalents for the weight of the material removed to make the opening, so that an exactly vertical position of the revolving pivot is secured. The ring $o$ at the top of the pivot is used for convenience in lifting and replacing the revolving part of the apparatus when required. When the lamp is lighted, the hot-air rises into the collecting-box $k$, and is there, by the fixed propeller, compelled to take the form of a spiral stream, which strikes more or less rectangularly against the faces of the blades of the movable propeller above, and causes it to rotate together with the parts of the apparatus which are attached to it, and so produces alternating flashes and occultations.

After the foregoing description the following explanation will suffice for the other drawings, the same letters representing the same parts.

In the apparatus represented by Figs. 4, 5, and 6 two sets of fixed propellers, $e\, e$, are used placed in a special heat-collecting box, $k$.

The apparatus shown in Figs. 7 and 8 is placed at the side of the main light $z$, and is driven by a special smaller lamp. This apparatus has two occulting-faces, $m\, m$, and a parabolic reflector, $p$, belonging to the light given by the smaller lamp.

In the apparatus shown in Figs. 9 and 10 the revolving portion is carried on a support formed by the heat-collecting box $k$, the upper part of which has a conical shape and the lower portion the form of a cylinder. This collecting-box is fixed to a ring, $q$, above the lenses $r$. The heat-collecting box has in its upper portion the fixed propeller $e$. The rod $c$ is attached to this propeller and supports the conical heat-deflector $d$ and the cup $f$, surrounded with cork or other non-conducting material to protect the cup and its immediate connections from undue heat. Inside this cup is the loose concave bottom piece, $f'$, of agate. The deflector $d$, which is furnished at the top with a circular disk of non-conducting material, is made in the form of a cone for the purpose of directing the stream of warm air toward the outer portions of the blades of the propeller. The suspending-rods $i$ are attached to the movable pivot $h$ and support a carrying-frame, $t$, from which four rods, $i'$, kept in their places by the ring $u$, descend to and support the occulting-cylinder $m$. In this cylinder there are two openings, one of which is filled with red glass $v$. In larger apparatus the blades of the revolving propeller are made broader, or two or more propellers with narrow blades are fixed to the central pivot, $h$, above each other.

I am aware of the lamp of Belknap, Patent No. 149,826, of April 21, 1874, in which is described a rotating lantern-frame resting upon liquid, in combination with a fan-wheel operated by an ascending current of hot air from a lamp; but

What I claim is—

1. A revolving light apparatus for producing changes of light provided with a central pivot, in combination with a cup and a stationary support to the upper part of which said cup is attached, one or more fixed propellers and deflectors, and a movable propeller and a lamp, substantially as and for the purposes set forth.

2. In a revolving light apparatus, the carrying-frame $t$, in combination with the movable pivot $h$, the suspending-rods $i$, which support said carrying-frame and connect it with the movable pivot, the rods $i'$, connected to said carrying-frame, the ring $u$, to hold the rods $i'$ in place, and the occulting-screen $m$, supported by the rods $i'$, substantially as described.

3. A revolving light apparatus for producing changes of light provided with a central pivot, in combination with a cup and a stationary support, to the upper part of which said cup is attached, the deflectors, and a fixed propeller, substantially as described and set forth.

4. In a revolving light apparatus, the deflector $d$, provided at its top with a circular disk of non-conducting material, substantially as and for the purpose described.

5. In a revolving light apparatus, the pivot $h$, in combination with the cup $f$, provided with the loose bottom piece, $f'$, and surrounded by non-conducting material, substantially as and for the purpose described.

6. In a revolving light apparatus, the occulting-screen $m$, provided with the openings, in combination with the revolving pivot and the counterpoises $n$, whereby the vertical position of the revolving pivot is secured, substantially as described.

In witness whereof I have hereunto signed my name in the presence of two subscribing witnesses.

LUDVIG FREDRIK LINDBERG.

Witnesses:
  FREDRIK L. EUQUIST,
  KARL PALM,
    *Both of Stockholm.*